(12) United States Patent
Maes

(10) Patent No.: US 7,783,635 B2
(45) Date of Patent: Aug. 24, 2010

(54) PERSONALIZATION AND RECOMMENDATIONS OF AGGREGATED DATA NOT OWNED BY THE AGGREGATOR

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 336 days.

(21) Appl. No.: 11/137,969

(22) Filed: May 25, 2005

(65) Prior Publication Data

US 2006/0271548 A1 Nov. 30, 2006

(51) Int. Cl.
*G06F 17/30* (2006.01)
(52) U.S. Cl. ........................... 707/732; 707/767
(58) Field of Classification Search .................... 707/10
See application file for complete search history.

(56) References Cited

U.S. PATENT DOCUMENTS

| | | | | |
|---|---|---|---|---|
| 4,996,642 | A * | 2/1991 | Hey | 705/27 |
| 6,308,328 | B1 | 10/2001 | Bowcutt et al. | |
| 6,334,127 | B1 * | 12/2001 | Bieganski et al. | 707/5 |
| 6,438,579 | B1 * | 8/2002 | Hosken | 709/203 |
| 6,546,555 | B1 | 4/2003 | Hjelsvold et al. | |
| 6,567,657 | B1 | 5/2003 | Holly et al. | |
| 6,665,659 | B1 * | 12/2003 | Logan | 707/3 |
| 6,732,366 | B1 | 5/2004 | Russo | |
| 6,769,127 | B1 | 7/2004 | Bonomi et al. | |
| 6,847,969 | B1 * | 1/2005 | Mathai et al. | 707/100 |
| 6,892,228 | B1 * | 5/2005 | Penders | 709/219 |
| 7,149,797 | B1 | 12/2006 | Weller et al. | |
| 7,181,523 | B2 | 2/2007 | Sim | |
| 7,197,570 | B2 | 3/2007 | Eylon et al. | |
| 7,272,651 | B1 | 9/2007 | Bolding et al. | |
| 7,360,210 | B1 | 4/2008 | Vacanti et al. | |
| 7,366,495 | B1 | 4/2008 | Magnotta et al. | |
| 7,386,623 | B2 | 6/2008 | Nishimura et al. | |
| 2001/0027558 | A1 | 10/2001 | Sasselli et al. | |
| 2002/0056126 | A1 | 5/2002 | Srikantan et al. | |
| 2002/0083124 | A1 | 6/2002 | Knox et al. | |
| 2002/0116291 | A1 * | 8/2002 | Grasso et al. | 705/27 |
| 2002/0143565 | A1 * | 10/2002 | Headings et al. | 705/1 |
| 2002/0152224 | A1 * | 10/2002 | Roth et al. | 707/104.1 |
| 2002/0152305 | A1 | 10/2002 | Jackson et al. | |
| 2002/0184195 | A1 * | 12/2002 | Qian | 707/3 |

(Continued)

OTHER PUBLICATIONS

Personalization technology application to internet content provider, Kuo et al (Elsevier Scinece Ltd, 2001).*

(Continued)

*Primary Examiner*—Pierre M Vital
*Assistant Examiner*—Augustine Obisesan
(74) *Attorney, Agent, or Firm*—Townsend and Townsend and Crew, LLP

(57) ABSTRACT

Techniques for providing recommendations for content are provided. Content is received from a source at a service provider. The content includes first recommendation information from the source. A service provider does not own the content provided from the source. A model is generated for the content using the first recommendation information and additionally a second recommendation information that is associated with the service provider. One or more recommendations based on the model are then generated. The recommendations are then provided to an entity, such as the user that requested the content.

29 Claims, 4 Drawing Sheets

U.S. PATENT DOCUMENTS

| | | |
|---|---|---|
| 2002/0194251 A1 | 12/2002 | Richter et al. |
| 2003/0028890 A1 | 2/2003 | Swart et al. |
| 2003/0061611 A1 | 3/2003 | Pendakur |
| 2003/0093799 A1 | 5/2003 | Kauffman et al. |
| 2003/0187794 A1 | 10/2003 | Irwin et al. |
| 2003/0233241 A1* | 12/2003 | Marsh ............................ 705/1 |
| 2003/0236745 A1 | 12/2003 | Hartsell et al. |
| 2003/0236905 A1 | 12/2003 | Choi et al. |
| 2004/0008688 A1 | 1/2004 | Matsubara et al. |
| 2004/0028055 A1 | 2/2004 | Madour et al. |
| 2004/0044677 A1* | 3/2004 | Huper-Graff et al. ........ 707/102 |
| 2004/0064579 A1 | 4/2004 | Jennings |
| 2004/0102182 A1 | 5/2004 | Reith et al. |
| 2004/0117500 A1 | 6/2004 | Lindholm et al. |
| 2004/0133923 A1 | 7/2004 | Watson et al. |
| 2004/0192253 A1 | 9/2004 | Usumi |
| 2004/0205043 A1 | 10/2004 | Alessi et al. |
| 2004/0267812 A1* | 12/2004 | Harris et al. ............. 707/104.1 |
| 2005/0009500 A1 | 1/2005 | Ear |
| 2005/0021765 A1 | 1/2005 | Flores et al. |
| 2005/0064875 A1 | 3/2005 | Gonsalves et al. |
| 2005/0076365 A1* | 4/2005 | Popov et al. .................. 725/46 |
| 2005/0154764 A1* | 7/2005 | Riegler et al. ............ 707/104.1 |
| 2005/0198332 A1 | 9/2005 | Laertz et al. |
| 2005/0246282 A1 | 11/2005 | Naslund et al. |
| 2005/0283791 A1 | 12/2005 | McCarthy et al. |
| 2006/0090187 A1 | 4/2006 | Chae et al. |
| 2006/0100987 A1* | 5/2006 | Leurs ............................ 707/3 |
| 2006/0206617 A1 | 9/2006 | Rey et al. |
| 2006/0230124 A1* | 10/2006 | Belfiore et al. .............. 709/219 |
| 2006/0271488 A1 | 11/2006 | Maes |
| 2006/0272028 A1 | 11/2006 | Maes |
| 2008/0215704 A1 | 9/2008 | Curcio et al. |

OTHER PUBLICATIONS

Context-Aware Recommendations in the Mobile Tourist Application COMPASS, Setten et al, AH 2004, LNCS3137, pp. 235-244, 2004.*

Modular Content Personalization Service Architecture for E-Commerce Applications, Boll et al, wecwis, pp. 213, Fourth IEEE International Workshop on Advanced Issues of E-Commerce and Web-Based Information Systems (WECWIS'02), 2002.*

Karjoth, G., "Access Control with IBM Tivoli Access Manager," *ACM Transactions on Information and Systems Security*, May 2003, vol. 6, No. 2, pp. 232-257.

Schulzrinne, H. et al., "Real Time Streaming Protocol (RTSP)," Network Working Group, Request for Comments: 2326, Category: Standards Track, Apr. 1998, 115 pages.

* cited by examiner

PERSONALIZATION AND RECOMMENDATIONS OF AGGREGATED DATA NOT OWNED BY THE AGGREGATOR

CROSS-REFERENCES TO RELATED APPLICATIONS

The present application incorporates by reference for all purposes the entire contents of the following:

U.S. application Ser. No. 11/138,844, entitled "PLATFORM AND SERVICE FOR MANAGEMENT AND MULTI-CHANNEL DELIVERY OF MULTI-TYPES OF CONTENTS", filed concurrently; and U.S. application Ser. No. 11/138,546, entitled "TECHNIQUES FOR ANALYZING COMMANDS DURING STREAMING MEDIA TO CONFIRM DELIVERY", filed concurrently.

BACKGROUND OF THE INVENTION

The present invention generally relates to recommendation engines and more specifically to techniques for providing recommendations for content not owned by a service provider.

Recommendations when an item, such as a video, is purchased or downloaded are very useful. For example, Amazon provides recommendations for other books or videos when a book is purchased on its website. This provides a user with personal selections that may be relevant to the purchased item. The quality of the recommendations is important in that if a user is interested in the recommendations, the user may purchase a recommended item. However, if the user does not like the recommendations, the user may not purchase the item.

Typically, recommendations are provided for content that is owned by an entity, such as an online bookstore. For example, the online bookstore is selling the books or videos and thus understands the content of the books and videos. Therefore, the online bookstore can generate recommendations based on that knowledge of the content and other factors, such as a user's buying preferences. These recommendations are based on content that the entity knows about.

With the number of services and content provided by the Internet and other networks, it is possible for a service provider to provide the content that is not owned by them. For example, service providers may aggregate content from other sources and provide the content to users. Because the typical recommendation engines rely on knowledge of the content, it is difficult to provide recommendations when the content is owned by another entity. Additionally, some content may be dynamically changing and/or live content that makes it difficult for the entity to know what the content includes. Thus, the entity may not be able to provide recommendations for the changing or live content.

BRIEF SUMMARY OF THE INVENTION

The present invention generally relates to providing recommendations for content. In one embodiment, content is received from a source at a service provider. The content includes first recommendation information from the source. In one embodiment, a service provider does not own the content provided from the source. A model is generated for the content using the first recommendation information and additionally a second recommendation information that is associated with the service provider. One or more recommendations based on the model are then generated. The recommendations are then provided to an entity, such as the user that requested the content.

In one embodiment, a method for providing recommendations for content from a content provider at a platform operated by a service provider separate from the content provider is provided. The method comprises: receiving content from the content provider to be provided to an entity, the content including metadata for recommendation information from the content provider; determining one or more recommendations for other content based on the metadata; and providing the one or more recommendations to the entity.

In another embodiment, a method for providing recommendations for content from a content provider at a platform operated by a service provider separate from the content provider is provided. The method comprises: receiving a plurality of content from a plurality of content providers, each content including metadata for recommendation information from each content provider; determining one or more recommendations based on first metadata for a first content from a first content provider, wherein second metadata for second content from a second content provider different from the first content provider is used to determine the one or more recommendations; and providing the one or more recommendations to an entity.

In yet another embodiment, a system configured to provide recommendations for content from a content provider at a platform operated by a service provider separate from the content provider is provided. The system comprises: logic to receive content from the content provider to be provided to an entity, the content including metadata for recommendation information from the content provider; logic to generate one or more models based on information accrued at the service provider; logic to determine one or more recommendations for other content based on the metadata and a model in the one or more models; and logic to provide the one or more recommendations to the entity.

In another embodiment, a platform for providing recommendations for content from a content provider at a platform operated by a service provider separate from the content provider is provided. The platform comprises: logic configured to receive content from the content provider to be provided to an entity, the content including metadata for recommendation information from the content provider; logic configured to determine one or more recommendations for other content based on the metadata; and logic configured to provide the one or more recommendations to the entity.

In another embodiment, a platform configured to provide recommendations for content from a content provider at a platform operated by a service provider separate from the content provider is provided. The platform comprises: logic configured to receive a plurality of content from a plurality of content providers, each content including metadata for recommendation information from each content provider; logic configured to determine one or more recommendations based on first metadata for a first content from a first content provider, wherein second metadata for second content from a second content provider different from the first content provider is used to determine the one or more recommendations; and logic configured to provide the one or more recommendations to an entity.

A further understanding of the nature and the advantages of the inventions disclosed herein may be realized by reference of the remaining portions of the specification and the attached drawings.

DETAILED DESCRIPTION OF THE INVENTION

Figure 1:
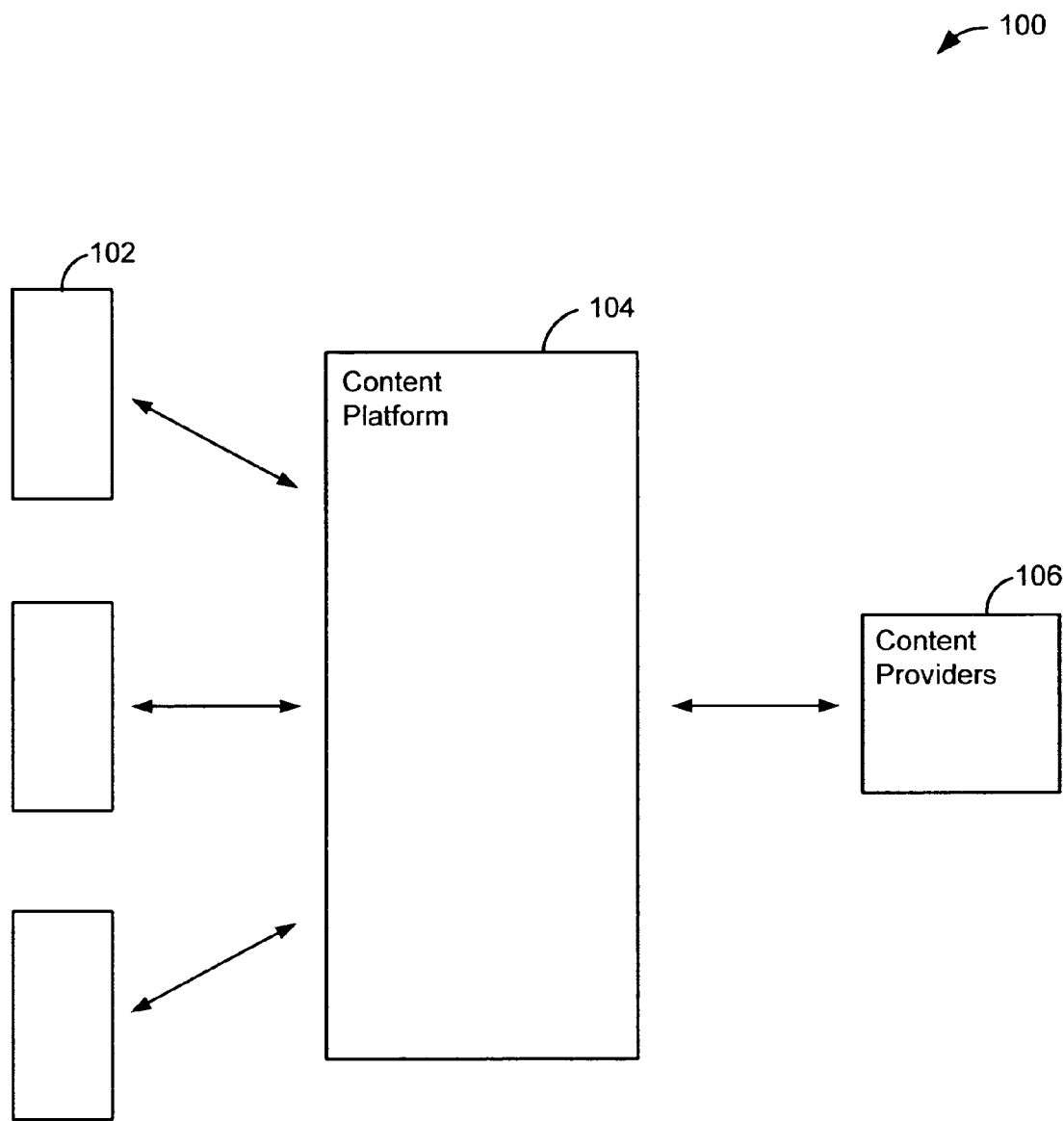
FIG. 1 depicts a system for managing content according to one embodiment of the present invention.

FIG. 1 depicts a system 100 for managing content according to one embodiment of the present invention. In one embodiment, system 100 includes one or more access devices 102, a content platform 104, and sources 106.

Access devices 102 include any devices that can send messages through access channels. An access channel is a channel in which messages of a certain format or protocol may be sent. For example, the messaging formats may be short message service (SMS), multimedia messaging service (MMS), voice, email, instant message (IM), facsimile, HyperText Transfer Protocol (HTTP), etc. In one example, SMS messages may be sent through an SMS access channel. Also, MMS messages may be sent through an MMS access channel and HTTP messages may be sent through the Internet. Each access channel may require a different protocol or format in order to send the messages through the channel.

Access devices 102 may include cellular phones, personal digital assistants (PDAs), personal computers, workstations, fax machines, plain old telephone service (POTS) telephones, etc. Access devices 102 are configured to send messages through access channels. For example, an SMS device sends messages through an SMS channel. Also, a access device 102 may be configured to send messages through multiple access channels. For example, a cellular phone may be configured to send SMS and MMS messages through SMS and MMS access channels.

Content platform 104 is configured to provide content to access devices 102. Content may be provided from external sources 106 or from content stored locally to messaging server 104. Examples of content may include any information. For example, content may be multimedia information, videos, data, television programs, audio information, etc.

Sources 106 may be any entities that provide content. For example, sources 106 may be content providers that may make content available through platform 104.

Further details of platform 104 are described in U.S. patent application Ser. No. 11/138,844, entitled "PLATFORM AND SERVICE FOR MANAGEMENT AND MULTI-CHANNEL DELIVERY OF MULTI-TYPES OF CONTENTS", filed concurrently. It will also be understood that other platforms 104 may be used.

Recommendations and Personalization Engine

Platform 104 can initiate personalized campaigns, marketing, sales initiatives, and recommendations based on user preferences, past history of usage, category of content, context, and preferred interest. These initiatives will be referred to recommendations hereafter but it should be understood that the recommendations may be used in providing any initiatives mentioned above or appreciated by a person skilled in the art.

Platform 104 may receive content owned by other sources 106. Accordingly, limited information may be known about the content because it is not owned by platform 104. Also, content may be too new (e.g. news or live) to have accumulated any pattern/information on the content. Using embodiments of the present invention, personalization and recommendations can be provided for content that platform 104 does not own and content that is new based on the information stored by platform 104.

Figure 2:
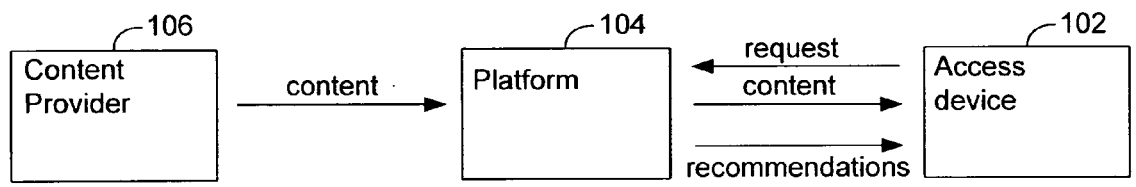
FIG. 2 depicts a system for providing recommendations for content according to one embodiment of the present invention.

FIG. 2 depicts a system 800 for providing recommendations for content according to one embodiment of the present invention. System 800 may be provided in system 100 where platform 104 is used to provide content and recommendations to access device 102 for source 106. It will be recognized, however, that platform 104 may be used in other systems. For example, platform 104 may provide content to a user's computer through the Internet, or provide content through the network on demand to a user's television, etc. Thus, content can be provided to devices other than access devices 102.

Source 106 in this embodiment provides content to platform 104. The content provided may be owned by source 106. For example, source 106 may maintain the content. Additionally, it will be recognized that source 106 may also retrieve content from other sources. Although a single source 106 is shown, it will be recognized that there may be multiple sources 106.

Platform 104 may be owned by a service provider. In one embodiment, platform 104 may provide content that is not owned by the service provider that owns platform 104. For example, platform 104 may be an aggregator that aggregates content from multiple sources 106. Content that is not owned by platform 104 may mean that the content is maintained by an entity outside platform 104, such as a source 106. Also, content not owned may be content that is uploaded to platform 104 by source 106. Platform 104 may store the content but no usage history or very little usage history applies because the new content has just been uploaded to platform 104. This is the same for new content (e.g. news broadcasts) or live content. Accordingly, platform 104 may not know much or anything about the content uploaded or provided by source 106.

Access devices 102 may be any of the devices that can request content from platform 104. In one embodiment, access device 102 may be associated with a user account from which a user lists downloads of content.

Access device 102 is configured to send a request to platform 104. If platform 104 has already uploaded the content from source 106, the content can be provided to access device 102. If the content is not uploaded on platform 104, then platform 104 may use a pointer to the content (as part of the metadata that has been uploaded by the content provider) and uses the pointer to contact source 106 in order to receive the content from source 106 or redirect the request from access device 102 to that content (typically in proxy mode to mask the URL of the real content). The content may then be sent from source 106 to access device 102 (possibly through platform 104). Any method may be used to send the content, such as streaming, downloading, pushing, etc.

In one embodiment, a menu of possible content may be provided to access device 102. When actions are taken, such as when content is browsed or purchased, additional/updated recommendations may be provided to the user of access device 102. In one embodiment, the recommendations may be for new content not owned by platform 104.

Figure 3:
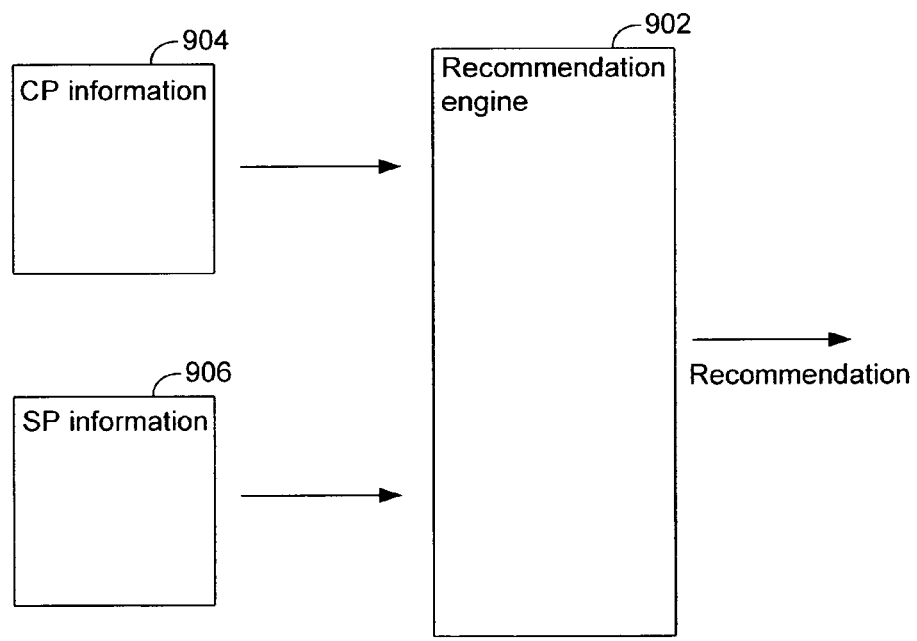
FIG. 3 depicts an example of information used in order to provide a recommendation according to one embodiment of the present invention.

FIG. 3 depicts an example of information used in order to provide a recommendation according to one embodiment of the present invention. As shown, a recommendation engine 902 uses source information 904 provided from source 106 and service provider information 906 that is associated with platform 104. Although source information 904 and service provider information 906 are shown, it will be understood that recommendation engine 902 may use other information.

Source information 904 may be any information that is provided by source 106. For example, source information may include a description of the content (e.g., a summary of the name/title/source/author), keywords associated with the content, categories for the content, target demographics, cost/condition of usage, recommendations determined by the source 106, etc.

The keywords associated with the content may include any keywords that describe the content. The keywords may overlap with the description of the content. For example, if the content includes a sports game between the Jets and Giants, the keywords may include "football", "Jets", "Giants", "NFL".

Categories for the content include the kind of content, such as the data type (e.g., MP3, Windows Media format), the genre of the content (e.g., sports, horror movie), etc. Other categories will be appreciated by a person skilled in the art.

The target demographics may be what the source 106 understands the target to be. For example, the target may be teenagers, adults, children, etc.

The cost and condition of usage may be how much the content should cost. The condition of usage may be digital rights management terms, and other recommendations like age requirements.

The recommendations provided may also be pointers to other content. For example, source 106 may include result of data mining analyses performed on its side or based on its own recommendation algorithms strategies that the content provider uses to provide pointers to the other content. These pointers point to content owned by the content provider and platform 104 is configured to use the pointers to link to other content that may be provided by other content providers (because platform 104 provides content from many sources 104). Using information in platform 104, the content provider may be able to access enough business intelligence data to be able to add some information about content from other sources 106 and refine its initial recommendations that it provides as meta data to the service provider when uploading it.

Additionally, other statistics, such as patterns, (pattern frequencies, etc.) that may be used in order to generate recommendations may be provided.

Service provider information 906 may be any information that is generated by the service provider (platform 104) via recommendation engines (e.g. online bookstores), data mining, etc. in real time or based on batch processing. For example, platform 104 may aggregate content from a variety of sources 106. This content may be similar to the content that is being provided to a access device 102. The statistics associated with the other content may be used to provide recommendations for the new content. Additionally, service provider information 906 may use user preferences, the past history of a user, prior categorizations by the same source 106, etc. This information may be information typically hidden from the content provider for privacy, regulation, or business reasons (i.e to maintain the relationship with the user instead of letting the content provider know the information. This is because platform 104 is used to aggregate content from many sources 106 and is the contact to access device 102 instead of source 106. In one embodiment, service provider information 906 does not include information on the new content received from source 106.

Recommendation engine 902 uses source information 904 and service provider information 906 in order to generate a model. The model may be generated using information provided by source 106. For example, the source information 904 may be provided as metadata by all sources 106 that send content to platform 104. Source information 904 may be in an expected or pre-determined format that can be processed by recommendation engine 902. Recommendation engine 902 can then determine which metadata should be used to generate the model. For example, for some content, certain fields of metadata or categories of metadata may be more appropriate or desirable. Thus, recommendation engine 902 is not restricted to the information that is being used by an outside source 106.

The models may be generated based on statistical optimizations (e.g., likelihood maximization, entropy maximization, expectation maximization (EM) algorithms, data mining, or other algorithms well known in the art. This optimization may use service provider information 906 for other content. For example, statistical estimates (interpolation/extrapolation) of similar content in the content aggregated by platform 104 may be used in the optimization.

The model may then be used to determine recommendations. For example, a conventional recommendation engine may be used to generate the recommendations from the model.

Figure 4:
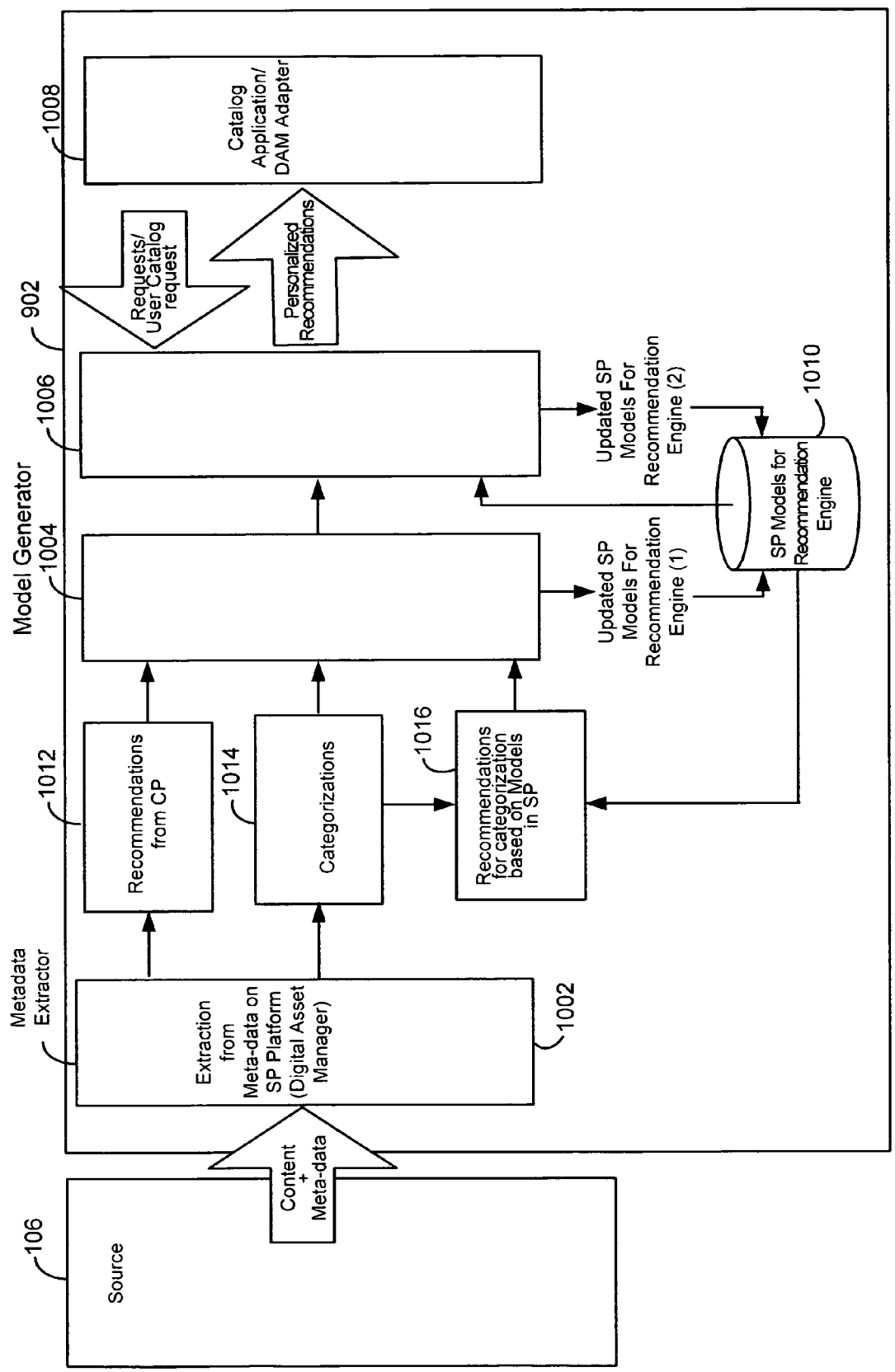
FIG. 4 depicts a recommendation engine according to embodiments of the present invention.

FIG. 4 depicts a more detailed embodiment of recommendation engine 902 according to embodiments of the present invention. As shown, recommendation engine 902 includes a metadata extractor 1002, a model generator 1004, a recommendation processor 1006, and catalog application 1008. Also, a database 1010 for storing the models is provided.

Metadata extractor 1002 is configured to extract the metadata received with the content and to determine how the metadata should be used. For example, metadata may be classified into recommendations from source 106 and/or categorizations from source 106. The recommendations include any recommendations that are provided by source 106. For example, recommendations may include hints of information of the content that are related to the type of content provided. The categories can be any categories that are provided by source 106. For example, categories may include sports, news, multimedia, etc.

Recommendations for the categories may also be provided based on models in forms associated with platform 104. For example, platform 104 may include content that is associated with the same category for the new content. Those recommendations may be associated with the new content.

The recommendations from a source 106, the categorizations, and recommendations for the categorizations based on the models of platform 104 are provided to model generator 1004. Model generator 1004 is then configured to generate a model. The model may be generated using any well-known method of generating a model. For example, selected information from the three inputs may be used to generate a model for the new content. The model is then stored in database 1010. The models may be generated using data mining techniques known in the art.

Recommendation processor 1006 may then use the model in order to provide recommendations. Recommendation processor 1006 may in addition add use user preferences and/or the prior user history in order to generate the recommendations for the model. In this way, the recommendations are then personalized. The personalized recommendations are sent to catalog application 222.

The model may be iteratively updated as more information is determined. For example, the content may be requested by other users and their preferences (or other content downloaded) may be used to update the model. Updated models may be used in order to provide recommendations when additional requests for the new data are made. A person skilled in the art may appreciate how to provide recommendations based on the models.

The recommendations that may be provided to a user may include a menu that proposes other content that a user can purchase and download. For example, a menu may indicate that this content may be pertinent to the content purchased.

Accordingly, using embodiments of the present invention, recommendations may be provided to users for content that may not be owned by platform 104. Instead of just using a user's preferences and prior history, information about the content may be used. A system of predefined metadata may be processed in order to generate a model from which a recommendation engine can produce recommendations. Accordingly, information from metadata from content owned by source 106 can be used to generate a model that is used by the recommendation engine. Accordingly, platform 104 may provide personalized recommendations for content owned by another entity.

Also, with respect to live data and news (new data), the recommendations of the content providers may not be useful because the data is too new to provide helpful recommendations. However, the categorization and past history known by the service provider for a category of the new data may be used to predict that particular new content like scores of a football game have a lot of value and should be recommended to male users etc.

Figure 5:
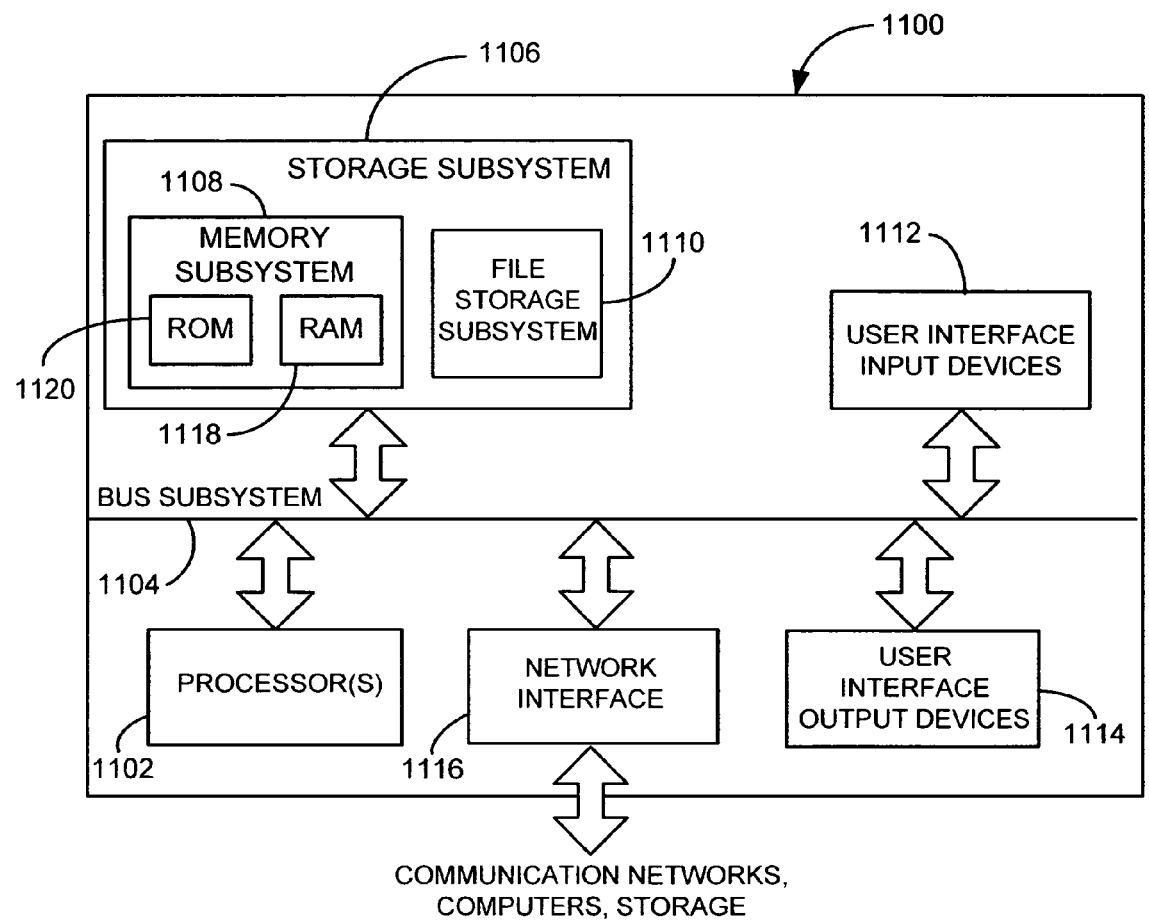
FIG. 5 is a simplified block diagram of data processing system that may be used to perform processing according to an embodiment of the present invention.

FIG. 5 is a simplified block diagram of data processing system 1100 that may be used to perform processing according to an embodiment of the present invention. As shown in FIG. 5, data processing system 1100 includes at least one processor 1102, which communicates with a number of peripheral devices via a bus subsystem 1104. These peripheral devices may include a storage subsystem 1106, comprising a memory subsystem 1108 and a file storage subsystem 1110, user interface input devices 1112, user interface output devices 1114, and a network interface subsystem 1116. The input and output devices allow user interaction with data processing system 1102.

Network interface subsystem 1116 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 1116 serves as an interface for receiving data from other sources and for transmitting data to other sources from data processing system 1100. Embodiments of network interface subsystem 1116 include an Ethernet card, a modem (telephone, satellite, cable, ISDN, etc.), (asynchronous) digital subscriber line (DSL) units, and the like.

User interface input devices 1112 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 1100.

User interface output devices 1114 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 1100.

Storage subsystem 1106 may be configured to store the basic programming and data constructs that provide the functionality of the present invention. For example, according to an embodiment of the present invention, software modules implementing the functionality of the present invention may be stored in storage subsystem 1106. These software modules may be executed by processor(s) 1102. Storage subsystem 1106 may also provide a repository for storing data used in accordance with the present invention. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 1104 provides a mechanism for letting the various components and subsystems of data processing system 1102 communicate with each other as intended. Although bus subsystem 1104 is shown schematically as a single bus, alternative embodiments of the bus subsystem may utilize multiple busses.

Data processing system 1100 can be of varying types including a personal computer, a portable computer, a workstation, a network computer, a mainframe, a kiosk, or any other data processing system. Due to the ever-changing nature of computers and networks, the description of data processing system 1100 depicted in FIG. 5 is intended only as a specific example for purposes of illustrating the preferred embodiment of the computer system. Many other configurations having more or fewer components than the system depicted in FIG. 5 are possible.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for providing recommendations for content at a platform operated by a service provider, the method comprising:
receiving, at the platform operated by the service provider from a content provider system, content to be provided to an entity, the content including at least in part live content and metadata that is supplied from the content provider, wherein the metadata includes recommendations from the content provider of other content;
after receiving the recommendations, determining with the platform operated by the service provider one or more recommendations for other content based on the metadata;
after determining, providing the one or more recommendations determined by the platform operated by the service provider from the platform operated by the service provider to the entity; and
generating, by the platform operated by the service provider, a model for the content using the metadata from the content provider, wherein generating the model comprises determining second recommendation information determined by the platform operated by the service provider and using the metadata and the second recommendation information to generate the model, the model being compatible with a recommendation engine configured to generate the one or more recommendations.

2. The method of claim 1, wherein the second recommendation information comprises information on preferences for the entity, information for past history for the entity, or information for entities other than the entity, and wherein the metadata that is supplied from the content provider comprises recommendation information of the other content that is related to the content that was received from the content provider.

3. The method of claim 1, wherein the content received is streamed, downloaded, or pushed to the entity.

4. The method of claim 1, wherein the content comprises new content.

5. The method of claim 1, further comprising:
receiving a request for the content from the entity at the platform operated by the service provider; and
providing the one or more recommendations determined by the platform operated by the service provider from the platform operated by the service provider to the entity based on the content requested in the request.

6. The method of claim 1, wherein the content is maintained by the content provider.

7. The method of claim 1, wherein the platform operated by the service provider has not provided the content before receiving the content from the content provider.

8. The method of claim 1, wherein the one or more recommendations determined by the platform operated by the service provider are generated based on the recommendation model generated by the content provider.

9. The method of claim 1, wherein the metadata comprises a category for the content, wherein the platform operated by the service provider uses the category to provide the one or more recommendations.

10. The method of claim 1, wherein the metadata is provided in a pre-defined format that can be processed by the platform operated by the service provider.

11. The method of claim 1, wherein the recommendations from the content provider of other content comprises one or more pointers to the other content.

12. A method for providing recommendations for content at a platform operated by a service provider, the method comprising:
receiving, at the platform operated by the service provider from each content provider of a plurality of content providers, content, each content including at least in part live content and metadata that is supplied from each content provider, wherein the metadata comprises recommendation information;
after receiving the recommendation information, determining with the platform operated by the service provider one or more recommendations based on first metadata for a first content from a first content provider, wherein second metadata for second content from a second content provider different from the first content provider is used to determine the one or more recommendations;
after determining, providing the one or more recommendations from the platform operated by the service provider to an entity; and
generating, by the platform operated by the service provider, a first model for the first content using the first metadata from the first content provider and a second model for the second content using the second metadata from the second content provider, wherein generating the first model comprises determining second recommendation information determined by the platform operated by the service provider and using the first metadata and the second recommendation information to generate the first model, the first model and second model being compatible with a recommendation engine configured to generate the one or more recommendations.

13. The method of claim 12, wherein each content in the plurality of content is owned by the plurality of content providers.

14. The method of claim 12, wherein second recommendation information comprises the second model.

15. The method of claim 12, wherein the second recommendation information comprises information on preferences for the entity, information for past history for the entity, or information for entities other than the entity.

16. The method of claim 12, wherein the content received is streamed, downloaded, or pushed to the entity.

17. The method of claim 12, wherein the content comprises new content.

18. The method of claim 12, wherein each content is maintained by each content provider.

19. The method of claim 12, wherein the platform operated by the service provider has not provided the content before receiving the content.

20. The method of claim 12, wherein the second recommendation information comprises information on preferences for the entity, information for past history for the entity, or information for entities other than the entity.

21. The method of claim 12, wherein the metadata comprises a recommendation model generated by the content provider for the content,
wherein the one or more recommendations are generated based on the recommendation model generated by the content provider.

22. The method of claim 12, wherein the metadata comprises a category for the content, wherein the platform operated by the service provider uses the category to provide the one or more recommendations.

23. The method of claim 12, wherein the metadata is provided in a pre-defined format that can be processed by the platform operated by the service provider.

24. A system configured to provide recommendations for content provided by a content provider at a platform operated by a service provider separate from the content provider, the system including a processor and a memory device including instructions that, when executed by the processor, cause the processor to:
   receive, from the content provider, content to be provided to an entity, the content including at least in part live content and metadata that is supplied from the content provider, wherein the metadata comprises first recommendation information;
   generate one or more models using the metadata from the content provider, wherein generating the one or more models comprises determining second recommendation information and using the metadata and the second recommendation information to generate the model, the model being compatible with a recommendation engine configured to generate the one or more recommendations;
   determine one or more recommendations for other content based on the metadata and a model in the one or more models after receiving the information; and
   provide the one or more recommendations to an access device of the entity after determining the one or more recommendations for other content.

25. The system of claim 24, wherein the information accrued at the service provider comprises entity preferences, a history of activity for the entity, or a history of activity for other entities.

26. The system of claim 24, wherein the content comprises new content.

27. The system of claim 24, wherein the metadata for recommendation information is a categorization of the content, wherein the model used to determine the one or more recommendations is for the categorization.

28. A platform for providing recommendations for content at a platform operated by a service provider, the platform including a processor and a memory device including instructions that, when executed by the processor, cause the processor to:
   receive, from the content provider, content to be provided to an entity, the content including at least in part live content and metadata that is supplied from the content provider, wherein the metadata comprises recommendation information;
   determine one or more recommendations for other content based on the metadata after receiving the recommendation information;
   provide the one or more recommendations to the entity after determining the one or more recommendations for other content; and
   generate a model for the content using the metadata from the content provider, wherein generating the model comprises determining second recommendation information and using the metadata and the second recommendation information to generate the model, the model being compatible with a recommendation engine configured to generate the one or more recommendations.

29. A platform configured to provide recommendations for content at a platform operated by a service provider, the platform including a processor and a memory device including instructions that, when executed by the processor, cause the processor to:
   receive, from the content provider, a plurality of content from a plurality of content providers, each content including at least in part live content and metadata that is supplied from each content provider, wherein the metadata comprises recommendation information;
   determine one or more recommendations based on first metadata for a first content from a first content provider, wherein second metadata for second content from a second content provider different from the first content provider is used to determine the one or more recommendations after receiving the recommendation information;
   provide the one or more recommendations to an entity after determining the one or more recommendations; and
   generate a first model for the first content using the first metadata from the first content provider and a second model for the second content using the second metadata from the second content provider, wherein generating the first model comprises determining second recommendation information and using the first metadata and the second recommendation information to generate the first model, the first model and second model being compatible with a recommendation engine configured to generate the one or more recommendations.

* * * * *

UNITED STATES PATENT AND TRADEMARK OFFICE
CERTIFICATE OF CORRECTION

PATENT NO. : 7,783,635 B2  
APPLICATION NO. : 11/137969  
DATED : August 24, 2010  
INVENTOR(S) : Maes Page 1 of 1

It is certified that error appears in the above-identified patent and that said Letters Patent is hereby corrected as shown below:

On the title page, in Item (56), in column 2, under "Other Publications", line 2, delete "Scinece" and insert -- Science --, therefor.

Signed and Sealed this
Tenth Day of May, 2011

David J. Kappos
*Director of the United States Patent and Trademark Office*